United States Patent
Sardella

(10) Patent No.: US 10,521,807 B2
(45) Date of Patent: Dec. 31, 2019

(54) METHODS AND SYSTEMS FOR DETERMINING A RISK OF AN EMOTIONAL RESPONSE OF AN AUDIENCE

(71) Applicant: TSG Technologies, LLC, St. Louis, MO (US)

(72) Inventor: Antonio Sardella, Wildwood, MO (US)

(73) Assignee: TSG Technologies, LLC, St. Louis, MO (US)

(*) Notice: Subject to any disclaimer, the term of this patent is extended or adjusted under 35 U.S.C. 154(b) by 296 days.

(21) Appl. No.: 14/019,239

(22) Filed: Sep. 5, 2013

(65) Prior Publication Data

US 2015/0066585 A1 Mar. 5, 2015

(51) Int. Cl.
*G06Q 30/02* (2012.01)

(52) U.S. Cl.
CPC .............................. *G06Q 30/0201* (2013.01)

(58) Field of Classification Search
None
See application file for complete search history.

(56) References Cited

U.S. PATENT DOCUMENTS

| | | |
|---|---|---|
| 6,006,206 A | 12/1999 | Smith et al. |
| 6,311,190 B1 | 10/2001 | Bayer et al. |
| 6,584,470 B2 | 6/2003 | Veale |
| 6,587,840 B1 | 7/2003 | Smith et al. |
| 6,694,307 B2 | 2/2004 | Julien |
| 6,983,320 B1 | 1/2006 | Thomas et al. |
| 7,013,323 B1 | 3/2006 | Thomas et al. |
| 7,050,981 B2 | 5/2006 | Smith et al. |
| 7,185,065 B1 | 2/2007 | Holtzman et al. |
| 7,188,078 B2 | 3/2007 | Arnett et al. |
| 7,188,079 B2 | 3/2007 | Arnett et al. |
| 7,197,470 B1 | 3/2007 | Arnett et al. |
| 7,302,475 B2 | 11/2007 | Gold et al. |
| 7,363,243 B2 | 4/2008 | Arnett et al. |
| 7,437,382 B2 | 10/2008 | Zhang et al. |
| 7,475,007 B2 | 1/2009 | Kanayama et al. |
| 7,523,085 B2 | 4/2009 | Nigam et al. |
| 7,546,310 B2 | 6/2009 | Tsuboi et al. |
| 7,596,552 B2 | 9/2009 | Levy et al. |
| 7,600,017 B2 | 10/2009 | Holtzman et al. |
| 7,660,783 B2 | 2/2010 | Reed et al. |
| 7,725,414 B2 | 5/2010 | Nigam et al. |
| 7,761,287 B2 | 7/2010 | Li et al. |
| 7,844,483 B2 | 11/2010 | Arnett et al. |
| 7,844,484 B2 | 11/2010 | Arnett et al. |

(Continued)

OTHER PUBLICATIONS

Notes from Lecture #22: "COS 424: Interacting with Data." Dated Apr. 24, 2008. Retrieved from [URL: http://www.cs.princeton.edu/courses/archive/spr08/cos424/scribe_notes/0424.pdf].*

(Continued)

*Primary Examiner* — Susanna M. Diaz
(74) *Attorney, Agent, or Firm* — Polsinelli PC

(57) ABSTRACT

A method for determining a risk of an emotional response of an audience to at least one publication is described. Additionally, a computing device for determining a risk of an emotional response of an audience to at least one publication is described. Moreover, a computer-readable storage device having processor-executable instructions embodied thereon, for determining a risk of an emotional response of an audience to at least one publication, is described.

18 Claims, 14 Drawing Sheets

(56) References Cited

U.S. PATENT DOCUMENTS

| | | | |
|---|---|---|---|
| 7,930,302 | B2 | 4/2011 | Bandaru et al. |
| 7,987,188 | B2 | 7/2011 | Neylon et al. |
| 8,010,545 | B2 | 8/2011 | Stefik et al. |
| 8,041,669 | B2 | 10/2011 | Nigam et al. |
| 8,126,882 | B2 | 2/2012 | Lawyer |
| 8,150,842 | B2 | 4/2012 | Brougher et al. |
| 8,165,985 | B2 | 4/2012 | Stefik |
| 8,239,189 | B2 | 8/2012 | Skubacz et al. |
| 8,239,397 | B2 | 8/2012 | Stefik et al. |
| 8,301,475 | B2 | 10/2012 | Bean et al. |
| 8,356,030 | B2 | 1/2013 | Neylon et al. |
| 8,375,024 | B2 | 2/2013 | Goeldi |
| 8,417,713 | B1 | 4/2013 | Blair-Goldensohn et al. |
| 8,458,154 | B2 | 6/2013 | Eden et al. |
| 8,463,595 | B1 | 6/2013 | Rehling et al. |
| 8,600,796 | B1* | 12/2013 | Sterne ............... G06Q 30/0201 705/7.29 |
| 2006/0287989 | A1 | 12/2006 | Glance |
| 2007/0011039 | A1* | 1/2007 | Oddo ................... G06F 21/316 705/7.33 |
| 2007/0073531 | A1* | 3/2007 | Carter ............... G06F 17/30707 704/4 |
| 2008/0109391 | A1* | 5/2008 | Chan ........................ G06N 5/00 706/45 |
| 2009/0048904 | A1 | 2/2009 | Newton et al. |
| 2009/0265344 | A1* | 10/2009 | Etoh ................ G06F 17/30864 |
| 2009/0281851 | A1 | 11/2009 | Newton et al. |
| 2010/0119053 | A1 | 5/2010 | Goeldi |
| 2011/0035211 | A1 | 2/2011 | Eden |
| 2011/0125550 | A1 | 5/2011 | Erhart et al. |
| 2011/0282880 | A1 | 11/2011 | Krichman et al. |
| 2012/0265755 | A1 | 10/2012 | McNally et al. |
| 2013/0036126 | A1* | 2/2013 | Anderson .......... G06F 17/3061 707/754 |
| 2013/0138430 | A1 | 5/2013 | Eden et al. |
| 2013/0231974 | A1* | 9/2013 | Harris ................ G06Q 30/0201 705/7.29 |
| 2014/0012794 | A1* | 1/2014 | Dillon ...................... G06N 5/02 706/46 |
| 2014/0039975 | A1* | 2/2014 | Hill ..................... G06F 17/5009 705/7.29 |
| 2014/0088944 | A1* | 3/2014 | Natarajan .............. G06Q 30/02 703/13 |
| 2014/0223462 | A1* | 8/2014 | Aimone ........... H04N 21/42201 725/10 |
| 2014/0244264 | A1* | 8/2014 | Thirumalainambi ....................... G06F 17/2785 704/270 |

OTHER PUBLICATIONS

Scherer et al. "Human Emotion Experiences Can Be Predicted on Theoretical Grounds: Evidence from Verbal Labeling." Swiss Center for Affective Sciences, University of Geneva, Geneva, Switzerland. vol. 8, No. 3, Mar. 2013.*

The Definition of "Closed Captioning" from The Internet Archive Wayback Machine's screen capture of a page from Wikipedia.com, Archived on Jan. 16, 2010, Retrieved from [URL: https://web.archive.org/web/20100116121802/https://en.wikipedia.org/wiki/Closed_captioning].*

Maheswaran et al., "The Influence of Message Framing and Issue Involvement", Journal of Marketing Research, 1990, pp. 361-367, vol. XXVII.

Rothman et al., "The Influence of Message Framing on Intentions to Perform Health Behaviors", Journal of Experimental Social Psychology, 1993, pp. 408-433, vol. 29.

Rothman et al., "Shaping Perceptions to Motivate Healthy Behavior: The Role of Message Framing", Psychological Bulletin, 1997, pp. 3-19, vol. 121, No. 1.

Slovic et al., "Behavioral Decision Theory Perspectives on Risk and Safety", Acta Psychologica, 1984, pp. 183-203, vol. 56.

Slovic, "Informing and Educating the Public About Risk", Risk Analysis, 1986, pp. 403-415, vol. 6, No. 4.

* cited by examiner

METHODS AND SYSTEMS FOR DETERMINING A RISK OF AN EMOTIONAL RESPONSE OF AN AUDIENCE

BACKGROUND

This invention relates generally to determining a risk of an emotional response, and more specifically to analyzing a publication and determining a risk of an emotional response to the publication by a particular audience.

When a news item, article, opinion, or other publication is disseminated to an audience, there is a risk that the audience will have an emotional response to the publication. In at least some known systems, detecting the emotional response occurs after the audience in question has already begun to take action, for example by generating a responsive publication, protesting, purchasing a particular item, or refraining from purchasing a particular item. In other words, a risk of an emotional response is not detected or measured before the audience takes action. Accordingly, any opportunity to take corrective measures to mitigate a risk of the emotional response has passed by the time the emotional response is detected.

What are needed are tools to determine a risk of an audience's emotional response to a publication before the audience's emotional response actually occurs.

BRIEF DESCRIPTION OF THE DISCLOSURE

In one aspect, a method for determining a risk of an emotional response of an audience to at least one publication is provided. The method is implemented by a computing device in communication with a database. The method includes receiving, by a computing device, the at least one publication. The method also includes retrieving, by the computing device from the database, a set of prototype vectors, wherein each prototype vector is associated with a risk factor that influences a risk of an emotional response of the audience and includes least one word. Additionally, the method includes generating, by the computing device, a test vector corresponding to each prototype vector, wherein each test vector includes each word in the corresponding prototype vector that also appears in the at least one publication. The method also includes determining, by the computing device, a magnitude of each risk factor by comparing each test vector to the corresponding prototype vector. Additionally, the method includes retrieving, by the computing device from the database, a model for weighting and summing the magnitudes of the risk factors. Further, the method includes determining a risk of an emotional response of the audience by weighting and summing the magnitudes of the risk factors according to the retrieved model.

In another aspect, a computing device for determining a risk of an emotional response of an audience to at least one publication is provided. The computing device is communicatively coupled to a database. The computing device is configured to receive the at least one publication. The computing device is further configured to retrieve, from the database, a set of prototype vectors, wherein each prototype vector is associated with a risk factor that influences a risk of an emotional response of the audience and includes least one word. The computing device is further configured to generate a test vector corresponding to each prototype vector, wherein each test vector includes each word in the corresponding prototype vector that also appears in the at least one publication. Additionally, the computing device is configured to determine a magnitude of each risk factor by comparing each test vector to the corresponding prototype vector. Additionally, the computing device is configured to retrieve, from the database, a model for weighting and summing the magnitudes of the risk factors and determine a risk of an emotional response of the audience by weighting and summing the magnitudes of the risk factors according to the retrieved model.

In another aspect, a computer-readable storage device having processor-executable instructions embodied thereon is provided. The processor-executable instructions are for determining a risk of an emotional response of an audience to at least one publication. When executed by a computing device communicatively coupled to a database, the processor-executable instructions cause the computing device to receive the at least one publication. The instructions further cause the computing device to retrieve, from the database, a set of prototype vectors, wherein each prototype vector is associated with a risk factor that influences a risk of an emotional response of the audience and includes least one word. The instructions additionally cause the computing device to generate a test vector corresponding to each prototype vector, wherein each test vector includes each word in the corresponding prototype vector that also appears in the at least one publication. Additionally, the instructions cause the computing device to determine a magnitude of each risk factor by comparing each test vector to the corresponding prototype vector. Additionally, the instructions cause the computing device to retrieve, from the database, a model for weighting and summing the magnitudes of the risk factors, and determine a risk of an emotional response of the audience by weighting and summing the magnitudes of the risk factors according to the retrieved model.

DETAILED DESCRIPTION OF THE DISCLOSURE

Figure 1:
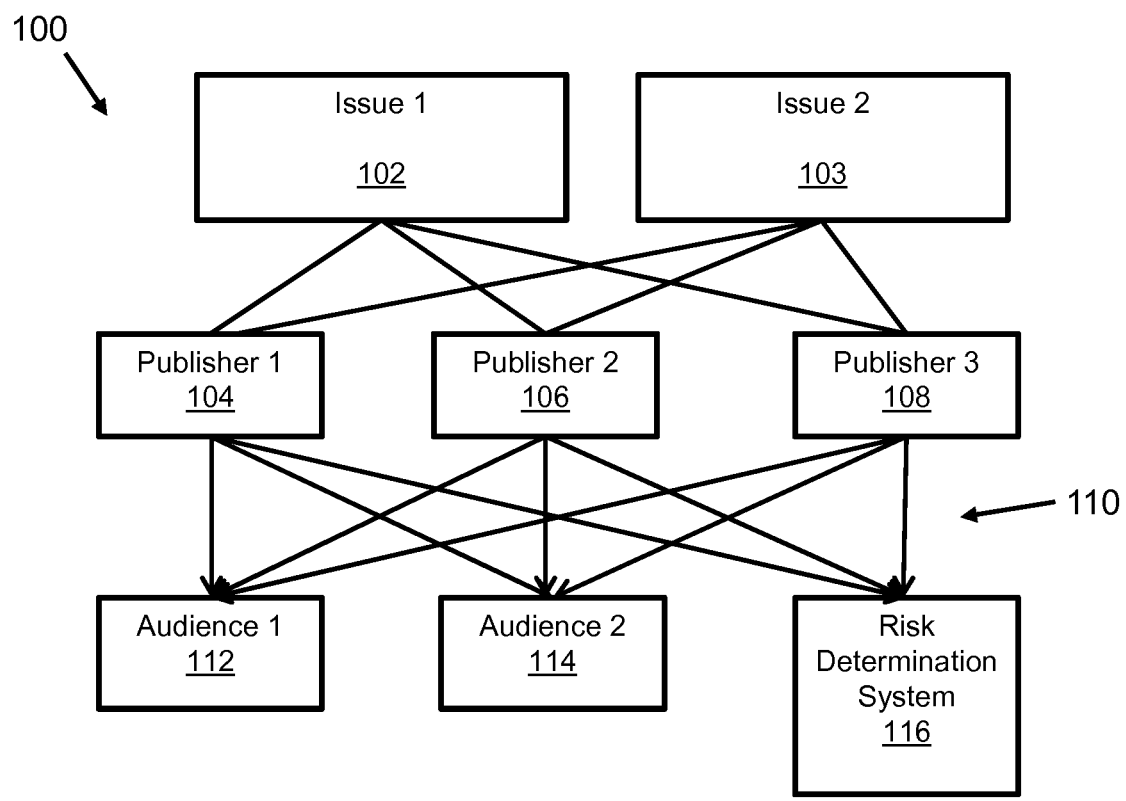
FIG. 1 is a schematic diagram illustrating an example environment in which publishers disseminate publications to audiences regarding issues.

Embodiments of a methods and systems described herein provide early signs that a particular audience may respond emotionally to one or more publications relating to one or more issues. An emotional response may be, for example, generating and distributing a responsive publication, protesting, purchasing a particular item, or refraining from purchasing a particular item. Additionally, the methods and systems described herein facilitate determining how a particular issue or publication may affect one category of audience over another category of audience. Furthermore, the methods and systems may reveal communication strategies from one or more publishers and systematic attempts to elicit an emotional response from an audience. The systems and methods herein allow a user to know about a risk of an emotional response from an audience before the emotional response occurs, and take action to reduce the risk of the emotional response.

The methods and systems described herein may be implemented using computer programming or engineering techniques including computer software, firmware, hardware or any combination or subset thereof, wherein the technical effect may include at least one of: (a) receiving, by the computing device, the at least one publication; (b) retrieving, by the computing device from the database, a set of prototype vectors, wherein each prototype vector is associated with a risk factor that influences a risk of an emotional response of the audience and includes least one word; (c) generating, by the computing device, a test vector corresponding to each prototype vector, wherein each test vector includes each word in the corresponding prototype vector that also appears in the at least one publication; (d) determining, by the computing device, a magnitude of each risk factor by comparing each test vector to the corresponding prototype vector; and (e) retrieving, by the computing device from the database, a model for weighting and summing the magnitudes of the risk factors; and (f) determining a risk of an emotional response of the audience by weighting and summing the magnitudes of the risk factors according to the retrieved model.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to determining a risk of an emotional response of an audience to at least one publication.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example environment 100 in which publishers disseminate publications to audiences regarding issues and in which a risk determination system 116 may operate. More specifically, a first publisher 104, a second publisher 106, and a third publisher 108 each disseminate publications 110 regarding a first issue 102 and a second issue 103. Publications 110 are received by a first audience 112 and a second audience 114. Additionally, publications 110 are received by risk determination system 116. Publications 110 may be, for example, news items, articles, opinions, blog entries, social media messages or postings, or other communications disseminated as text, images, video, audio, or any combination thereof. Depending on the publisher 104, 106, 108, first issue 102 may be portrayed in differing manners, for example by word choice in publications 110 disseminated by the publisher 104, 106, 108. Accordingly, publications 110 disseminated by first publisher 104, regarding first issue 102, and received by first audience 112 may have a higher risk of causing an emotional response in audience 112 than do publications 110 disseminated by second publisher 104 regarding first issue 102.

Additionally, first audience 112 and second audience 114 may perceive the same publication 110 differently, due to circumstances or characteristics associated with each audience 112 and 114. More specifically, first audience 112 may fall within a first age range, have a first culture, have a first religion, be of a first gender, fall within a first income range, and/or be located in a first geographic region, whereas second audience 114 may fall within a second age range, have a second culture, have a second religion, be of a second gender, fall within a second income range, and/or be located in a second geographic region, wherein one or more of the above characteristics or circumstances differs from that of first audience 112. Accordingly, first audience 112 may be considered to fall within a first category and second audience 114 may be considered to fall within a second category.

Given that first audience 112 differs from second audience 114, first audience 112 may have a higher risk of an emotional response than second audience 114 to one or more publications regarding first issue 102, which may be, for example, age discrimination for the age range of first audience 112. Likewise, second audience 114 may have a higher emotional response risk than first audience to one or more publications 110 pertaining to second issue 103, which may be police brutality in a geographic region where second audience is located. Risk determination system 116 receives publications 110 and determines the risks of emotional response from first audience 112, second audience 114, and/or other audiences to one or more of publications 110 regarding one or more of first issue 102, second issue 103, and/or other issues.

Figure 2:
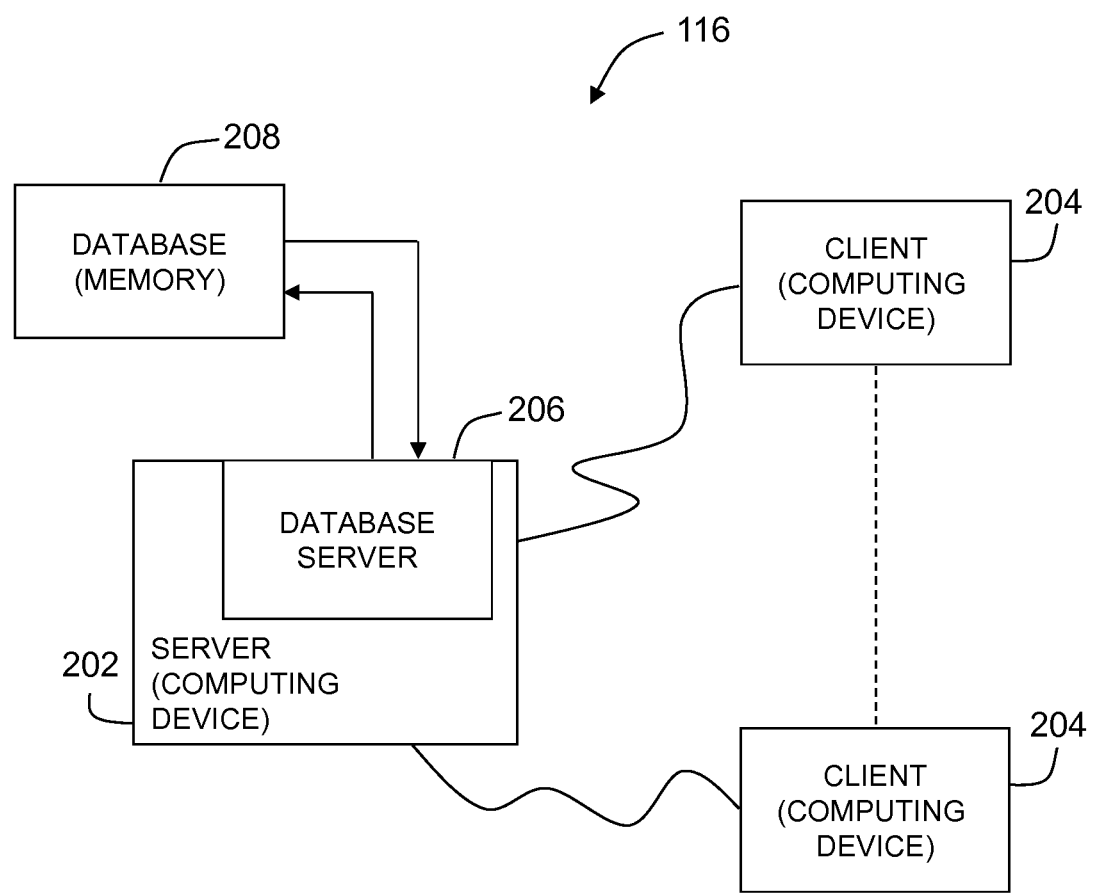
FIG. 2 is a simplified block diagram of a risk determination system including a plurality of computing devices in accordance with one example embodiment of the present disclosure.

FIG. 2 is a simplified block diagram of a risk determination system including a plurality of computing devices in accordance with one example embodiment of the present disclosure. In the example embodiment, system 116 includes a server system 202 and a plurality of client subsystems, also referred to as client systems 204 or client computing devices, connected to server system 202. In one embodiment, client systems 204 are computers including a web browser, such that server system 202 is accessible to client systems 204 using the Internet. Client systems 204 are interconnected to the Internet through many interfaces including a network, such as a local area network (LAN) and/or a wide area network (WAN), dial-in connections, cable modems, wireless-connections, and special high-speed ISDN lines. Client systems 204 may be any device capable of interconnecting to the Internet including a web-based phone, personal digital assistant (PDA), or other web-connectable equipment. A database server 206 is connected to a database 208 containing information on a variety of matters, as described below in greater detail. In one embodiment, database 208 is stored on server system 202 and may be accessed by potential users at one of client systems 204 by logging onto server system 202 through one of client systems 204. In any alternative embodiment, database 208 is stored remotely from server system 202 and may be non-centralized. Server system 202 could be any type of computing device configured to perform the steps described herein. As discussed below, publications 110, risk factors, prototype vectors associated with different audiences, and weighting models associated with different audiences, are stored within database 208.

Figure 3:
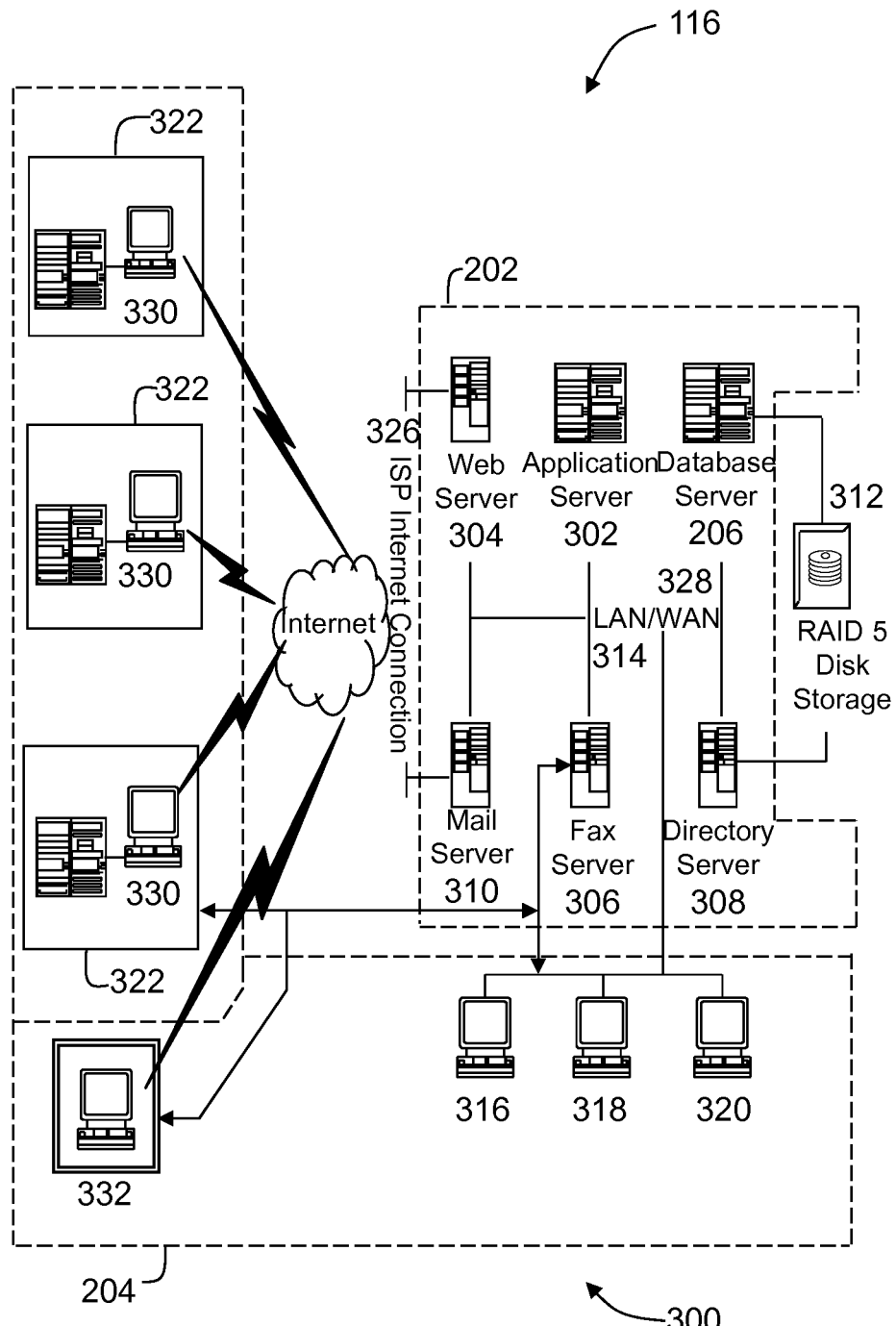
FIG. 3 is an expanded block diagram of a server architecture of the risk determination system, including the plurality of computing devices, in accordance with one example embodiment of the present disclosure.

FIG. 3 is an expanded block diagram of a server architecture of risk determination system 116 in accordance with one embodiment of the present disclosure. Risk determination system 116 includes server system 202 and client systems 204. Server system 202 further includes database server 206, an application server 302, a web server 304, a fax server 306, a directory server 308, and a mail server 310. A disk storage unit 312 is coupled to database server 206 and directory server 308. Servers 206, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet.

Each workstation, 316, 318, and 320, is a personal computer having a web browser. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

Server system 202 is configured to be communicatively coupled to various entities, including aggregators 322, using an Internet connection 326. Aggregators 322 may receive and aggregate publications 110 from publishers, for example first publisher 104, second publisher 106, and third publisher 108. Additionally, aggregators 322 may convert publications 110 from one format to another, for example converting a physical publication to an electronic format and/or converting images, video, and/or audio to text. Additionally, aggregators 322 may perform language identification and/or language translation. Aggregators 322 may transmit publications 110 to server system 202 for storage in database 208. In other embodiments, server system 202 directly performs one or more of the functions of aggregators 322 described above. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328.

In the example embodiment, any authorized individual or entity having a workstation 330 may access system 300. At least one of the client systems includes a manager workstation 332 located at a remote location. Workstations 330 and 332 include personal computers having a web browser. Also, workstations 330 and 332 are configured to communicate with server system 202. Furthermore, fax server 306 communicates with remotely located client systems, including a client system 332, using a telephone link. Fax server 306 is configured to communicate with other client systems 316, 318, and 320 as well.

Figure 4:
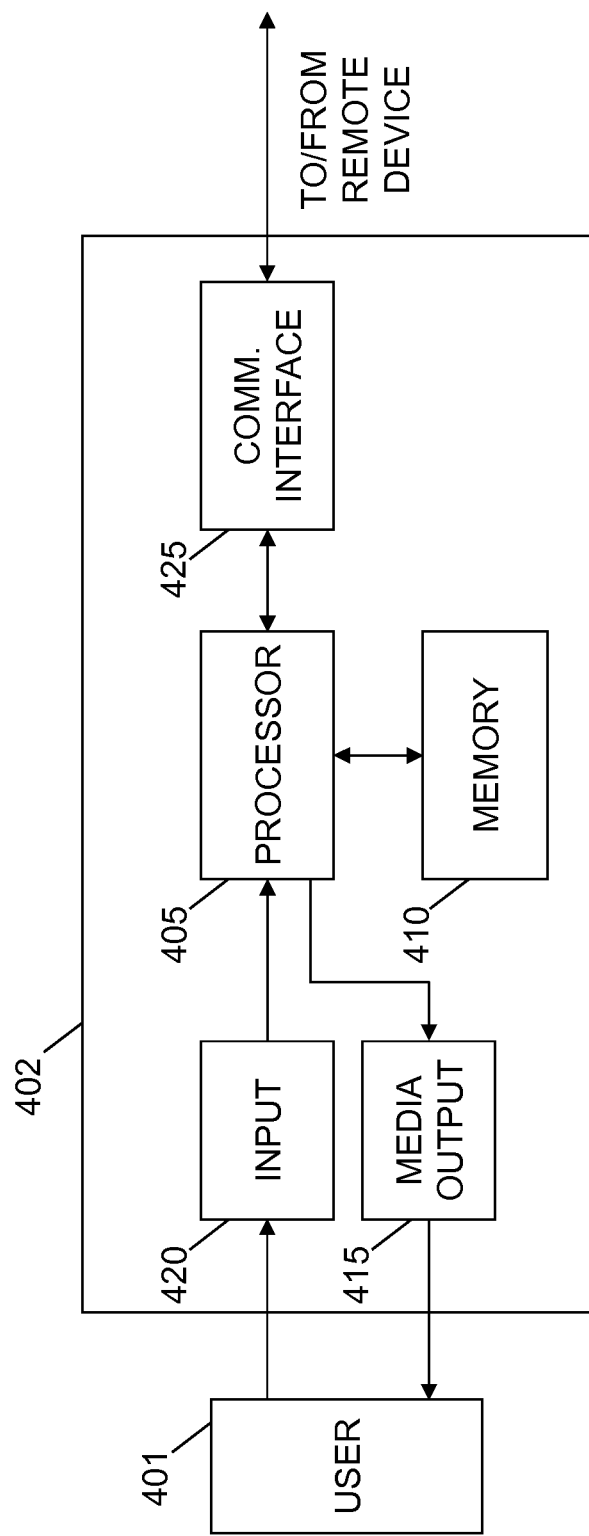
FIG. 4 illustrates an example configuration of a client system shown in FIGS. 2 and 3.

FIG. 4 illustrates an example configuration of a client system ("client computing device") shown in FIGS. 2 and 3. Client computing device 402 may include, but is not limited to, client computing devices 204, 316, 318, and 320, workstation 330, and manager workstation 332 (shown in FIG. 3).

Client computing device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or other data to be stored and retrieved. Memory area 410 may include one or more computer-readable media.

Client computing device 402 also includes at least one media output component 415 for presenting information to user 401. Media output component 415 is any component capable of conveying information to user 401. In some embodiments, media output component 415 includes an output adapter such as a video adapter and/or an audio adapter. An output adapter is operatively coupled to processor 405 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 420 for receiving input from user 401. Input device 420 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 415 and input device 420.

Client computing device 402 may also include a communication interface 425, which is communicatively couplable to a remote device such as server system 202. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 401 via media output component 415 and, optionally, receiving and processing input from input device 420. A user interface may include, among other possibilities, a web browser and client application. Web browsers enable users, such as user 401, to display and interact with media and other information typically embedded on a web page or a website from server system 202. A client application allows user 401 to interact with a server application from server system 202.

Figure 5:
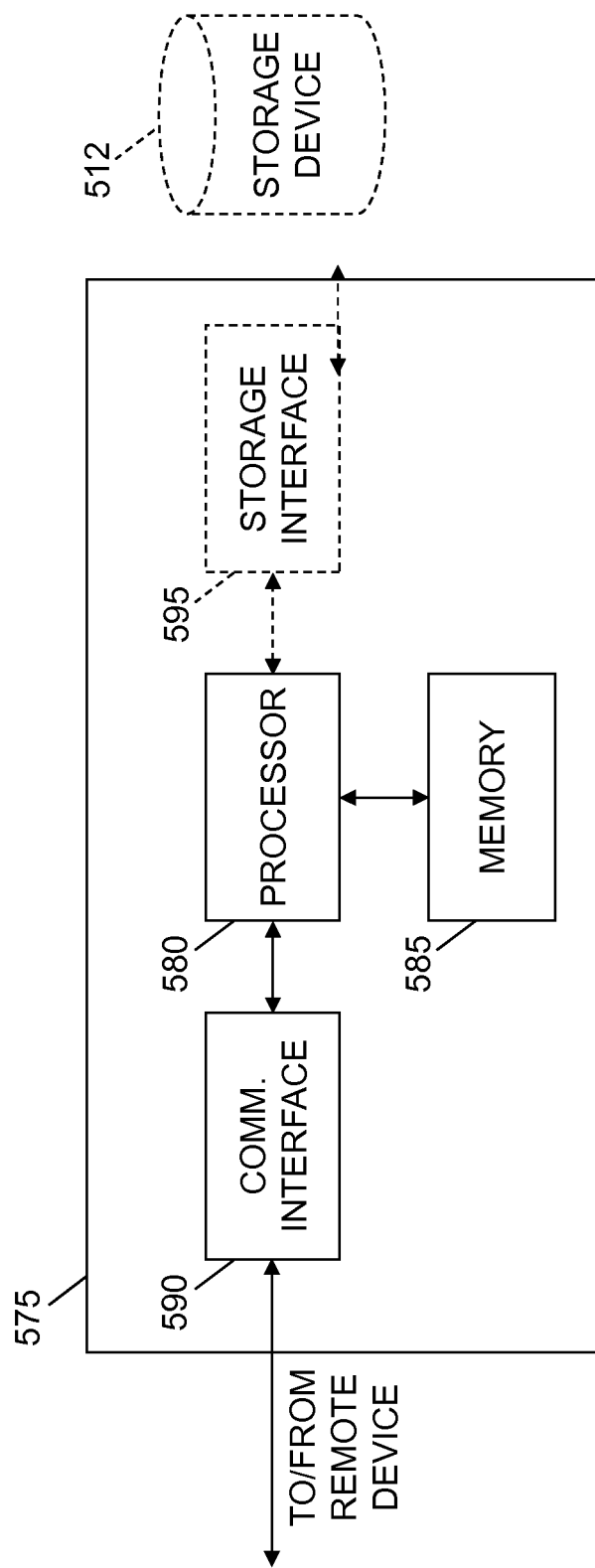
FIG. 5 illustrates an example configuration of a server system shown in FIGS. 2 and 3.

FIG. 5 illustrates an example configuration of a server computing device 575 such as server system 202 (shown in FIGS. 2 and 3). Server computing device 575 may include, but is not limited to, database server 206, application server 302, web server 304, fax server 306, directory server 308, and mail server 310.

Server computing device 575 includes a processor 580 for executing instructions. Instructions may be stored in a memory area 585, for example. Processor 580 may include one or more processing units (e.g., in a multi-core configuration).

Processor 580 is operatively coupled to a communication interface 590 such that server computing device 575 is capable of communicating with a remote device such as client computing device 402 or another server computing device 575. For example, communication interface 590 may receive requests from client computing devices 204 via the Internet, as illustrated in FIGS. 2 and 3.

Processor 580 may also be operatively coupled to a storage device 512. Storage device 512 is any computer-operated hardware suitable for storing and/or retrieving data. In some embodiments, storage device 512 is integrated in server computing device 575. For example, server computing device 575 may include one or more hard disk drives as storage device 512. In other embodiments, storage device 512 is external to server computing device 575 and may be accessed by a plurality of server computing devices 575. For example, storage device 512 may include multiple storage units such as hard disks or solid state disks in a redundant array of inexpensive disks (RAID) configuration. Storage device 512 may include a storage area network (SAN) and/or a network attached storage (NAS) system.

In some embodiments, processor 580 is operatively coupled to storage device 512 via a storage interface 595. Storage interface 595 is any component capable of providing processor 580 with access to storage device 512. Storage interface 595 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 580 with access to storage device 512.

Memory areas 410 and 585 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 6:
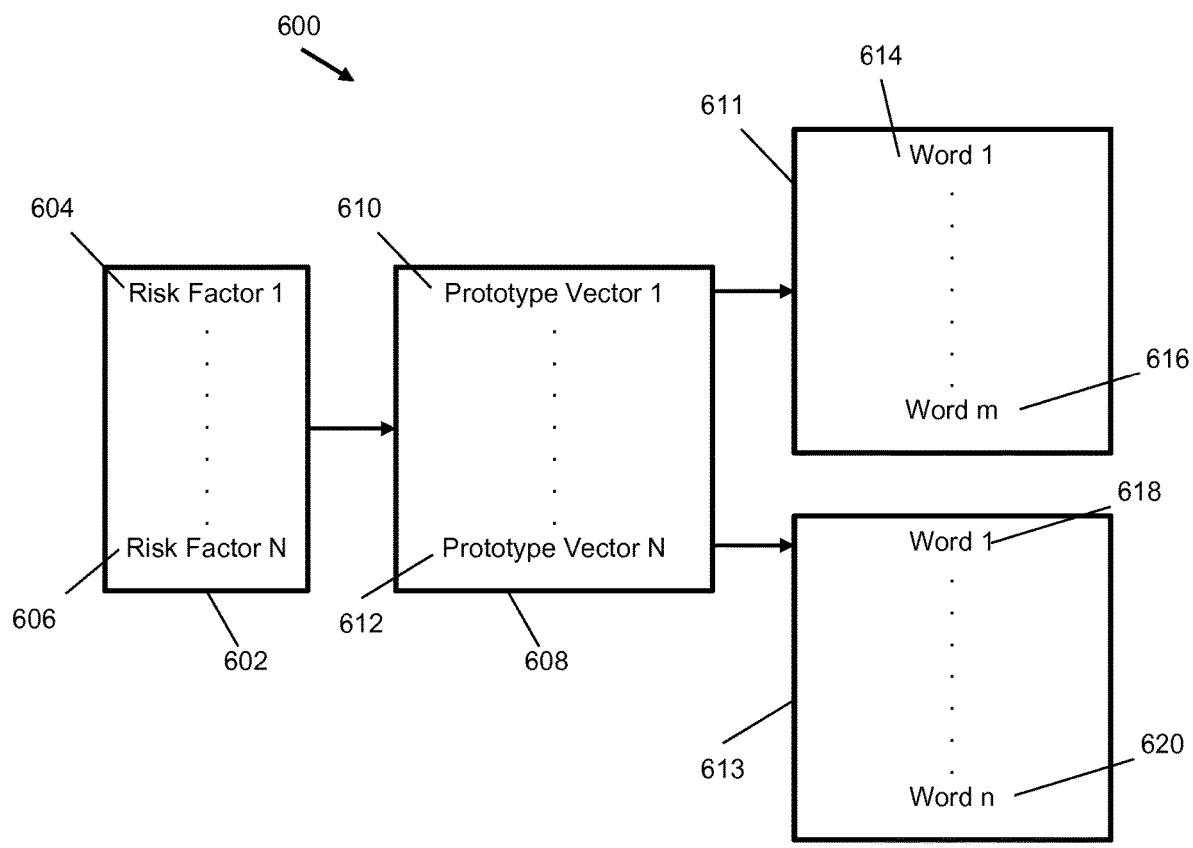
FIG. 6 is a block diagram of an example risk factor set and a prototype vector set for a first audience.

FIG. 6 is a block diagram 600 of an example risk factor set 602 and a prototype vector set 608 corresponding to risk factor set 602 for first audience 112. Risk factor set 602 is a set of distinct psychological characteristics ("risk factors") found by researchers to influence an overall perception of risk, attitudes, and behavior of an audience, for example first audience 112. Risk factor set 602 includes a first risk factor 604 and a last risk factor 606. For example, risk factor set 602 may include 14 risk factors. First risk factor 604 may be, for example, "catastrophic potential", corresponding to the degree to which an issue can negatively affect large populations or occur frequently over time. Last risk factor 606 may be, for example, "vulnerability", corresponding to the degree to which victims of an issue are members of vulnerable populations versus populations with resources to protect themselves.

A set of documents identified as being relevant to each risk factor, as well as a set of documents identified as having no relevance to each risk factor, are stored in electronic format in database 208. Server system 202 executes a query for each of the risk factors and returns conceptually similar records (e.g., documents). Server system 202 selects a predetermined number of the returned documents, for example 500 of the returned documents, with the strongest mathematical similarity to the initial set of documents (i.e., the documents identified as being relevant to each risk factor), thereby generating a plurality of document sets. Within each of the document sets, server system 202 lexically analyzes occurrences and distributions of words, thereby generating a lexicon associated with each risk factor. Additionally, for verification that each generated lexicon for each risk factor is conceptually representative of the associated risk factor, server system 202 compares each of the generated lexicons to the documents identified as having no relevance to each risk factor, and to each of the other generated lexicons. For each word in each lexicon, server system 202 assigns a normalized frequency of occurrences to the word. The lexical analysis and assigning of normalized frequency to each word, as described above, results in a prototype vector set 608.

Prototype vector set 608 includes a first prototype vector 610 and a last prototype vector 612. For example, prototype vector set 608 may include 14 prototype vectors. Each prototype vector, for example first prototype vector 610, includes a word set 611, including a first word 614 and a last word 616. Each word in word set 611 is weighted at least by its normalized frequency, described above. In some embodiments, each word in word set 611 is also weighted by its relevance to the corresponding risk factor. Each prototype vector, for example first prototype vector 610, may be considered a "perfect" lexical representation of the corresponding risk factor, for example first risk factor 604. For example, first prototype vector 610, which corresponds to first risk factor 604, may include words such as "catastrophe", "devastation", and/or "ruin". Last prototype vector 612, corresponding last risk factor 606, may include a word set 613 having a first word 618, for example "affair", and a last word 620, for example "elder". Server system 202 may store and retrieve from database 208 risk factors and prototype vectors generated according to the description above. Additionally, server system 202 may store and retrieve risk factors and prototype vectors in database 208 according to categories of audiences. In some implementations, a prototype vector, such as prototype vector 610, is stored as a text file ("ASCII file") with three columns in a tab delimited format, wherein a first column includes each word in the corresponding word set 611, a second column includes the normalized frequency of each word, and a third column includes a weight assigned to each word.

Figure 7:
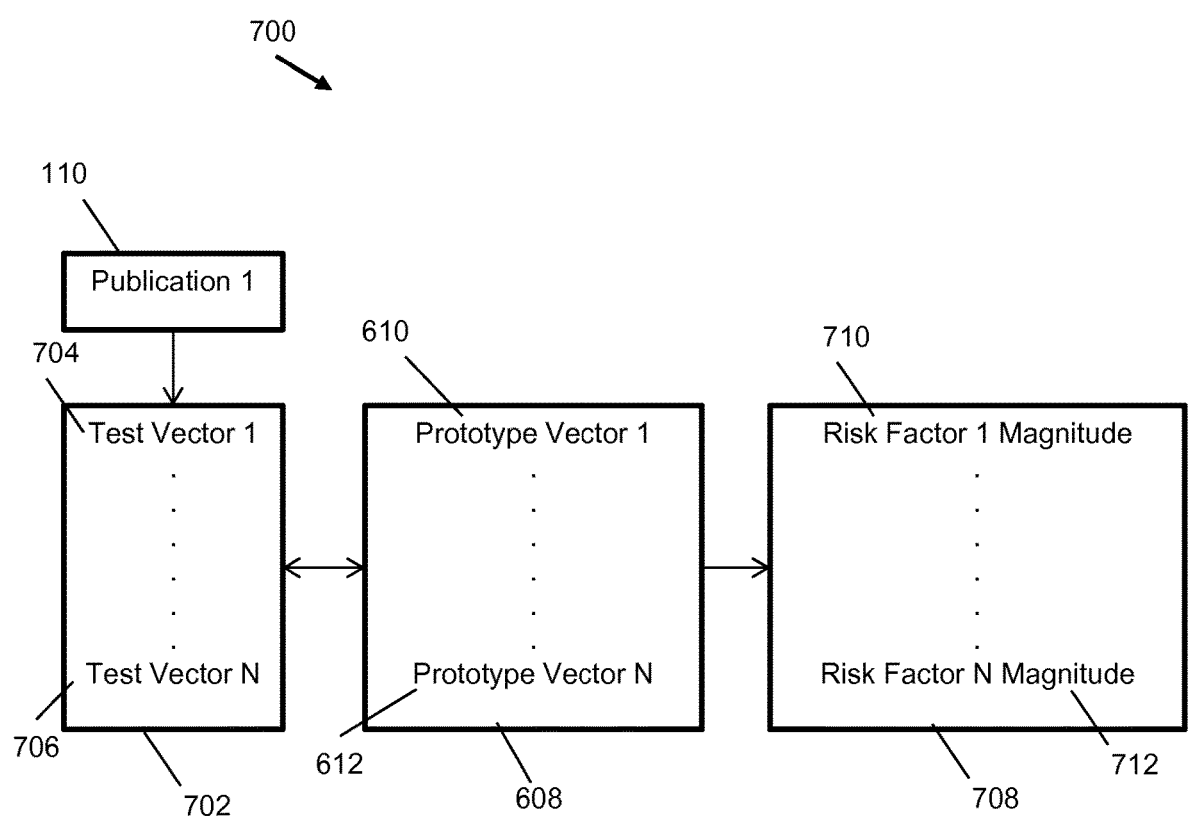
FIG. 7 is a block diagram of an example relationship between a first publication, a test vector set generated from the first publication, a prototype vector set, and determined magnitudes of risk factors.

FIG. 7 is a block diagram 700 of an example relationship between a first publication 110, a test vector set 702 generated from the first publication 110, prototype vector set 608, and a determined magnitude set 708 corresponding to risk factor set 602 (FIG. 6). As publications 110, for example first publication 110, are received by server system 202, the full text of each publication, for example first publication 110, is indexed by server system 202 to identify any and all words in prototype vector set 608. More specifically, server system 202 generates test vector set 702 which includes a test vector, for example first test vector 704 and last test vector 706, corresponding to each risk factor in risk factor set 602. Each test vector, for example first test vector 704, includes a set of words in first publication 110 that are also in the prototype vector (e.g., first prototype vector 610), associated with the risk factor (e.g., first risk factor 604 (FIG. 6)). Server system 202 additionally stores, in test vector 704, a number of occurrences of each word. Any occurrences of synonyms are counted as occurrences of the word as well. Additionally, server system 202 multiplies the number of occurrences associated with each word in first test vector 704 with the weight assigned to the word in the corresponding prototype vector (e.g., first prototype vector 610).

Server system 202 compares each test vector in test vector set 702 to the corresponding prototype vector in prototype vector set 608, thereby determining a presence and/or magnitude of each of the risk factors associated with first publication 110. In some embodiments, server system 202 mathematically compares each test vector (e.g., first test vector 704) with the corresponding prototype vector (e.g., first prototype vector 610) to determine the presence and/or magnitude of the corresponding risk factor (e.g., example first risk factor 604 (FIG. 6)). For example, a mathematically determined high similarity (low distance) between the words in first test vector 704 and first prototype vector 610 indicates that first risk factor 604 is present and has a relatively high magnitude in first publication 110. In some embodiments, server system 202 counts the words in each test vector to determine the magnitude of the corresponding risk factor. In some embodiments, a magnitude of zero represents an absence (i.e., no presence) of the corresponding risk factor. Server system 202 may store and retrieve from database 208 risk factor magnitudes determined according to the description above.

In some implementations, the correlation between each test vector and its corresponding prototype vector is calculated using a Pearson correlation coefficient, which is defined in Equation 1.

$$\text{Correlation}(X, Y) = \frac{\Sigma(x - \bar{x})(y - \bar{y})}{\sqrt{\Sigma(x - \bar{x})^2(y - \bar{y})^2}} \quad \text{(Eq. 1)}$$

In Equation 1, x represents the prototype vector and y represents the test vector. The resulting value is a relative measure reflecting the degree to which a specific risk factor is present in a publication (e.g., first publication 110) and ranges from −1 to 1, where values closer to 1 represent a stronger correlation between the test vector and the corresponding prototype vector, and lower values represent a weaker correlation.

Figure 8:
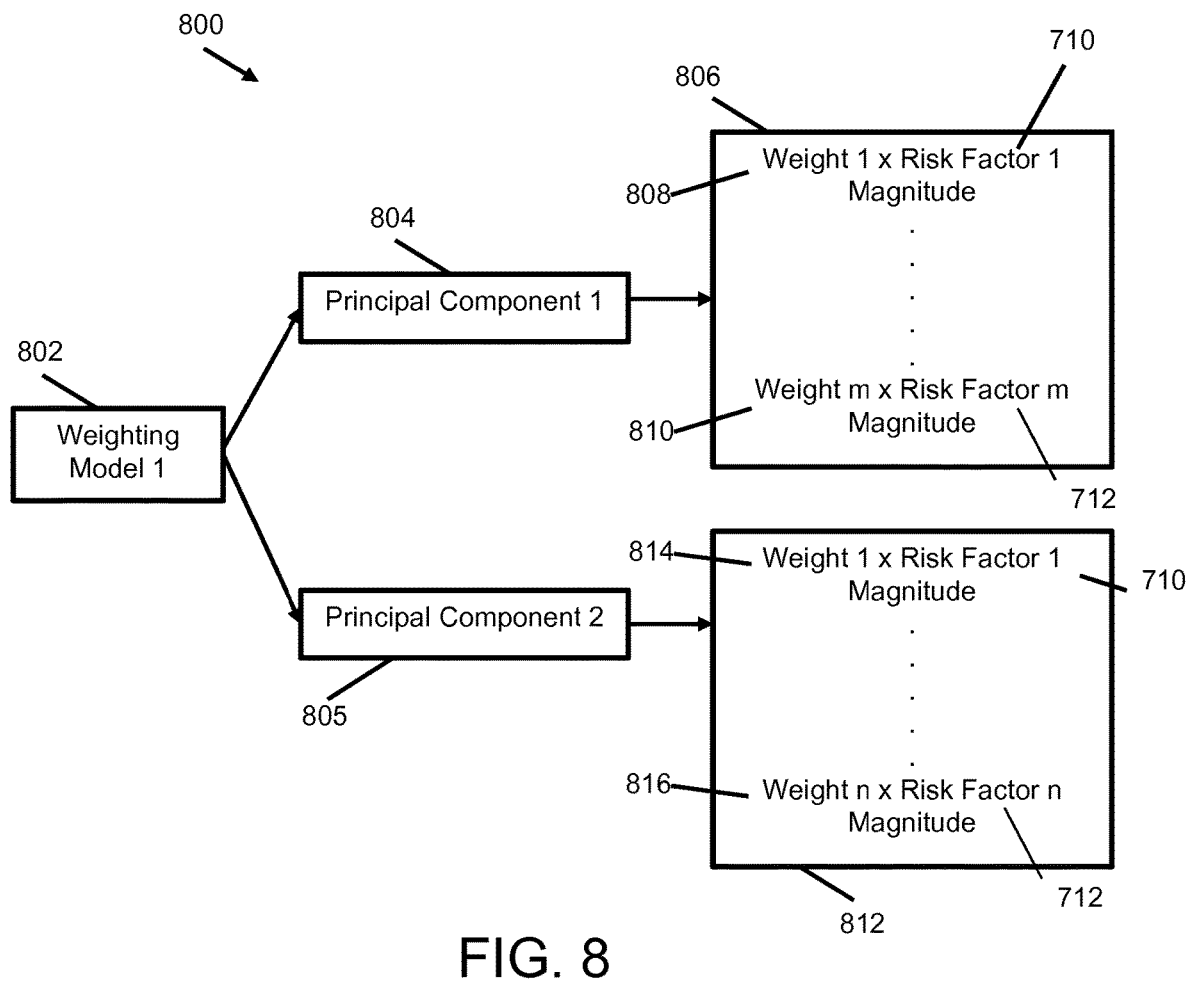
FIG. 8 is a block diagram of an example relationship between a weighting model associated with a first audience, principal components of the weighting model, and weights applied to risk factor magnitudes for each principal component.

FIG. 8 is a block diagram 800 of an example relationship between a weighting model 802 associated with first audience 112, a first principal component 804 and a second principal component 805 of weighting model 802. Block diagram 800 also shows a relationship between first principal component 804 and a first weight set 806. Additionally, block diagram 800 shows a relationship between second principal component 805 and a second weight set 812. First weight set 806 represents a method for weighting risk factor magnitudes, for example first magnitude 710 and last magnitude 712, using corresponding weights, for example first weight 808 and last weight 810. Likewise, second weight set 812 represents a method for weighting risk factor magnitudes, for example first magnitude 710 and last magnitude 712, using corresponding weights, for example first weight 814 and last weight 816. More specifically, server system 202 may generate, store, and retrieve from database 208 weighting model 802 associated with first audience 112. Weighting model 802 includes two principal components 804 and 805, which each correspond to a method of weighting and summing risk factor magnitudes from determined magnitude set 708. For example, first principal component 804 is equal to first weight 808 multiplied by first risk factor magnitude 710, plus each remaining risk factor magnitude multiplied by a corresponding weight, for example last weight 810 multiplied by last risk factor magnitude 712. Server system 202 may generate weighting model 802 by performing statistical analysis, for example principal component analysis (PCA). Server system 202 may store and retrieve weighting models in database 208 according to categories of audiences.

More specifically, server system 202 applies PCA to a predetermined number, for example 1000, of randomly selected of publications. In some embodiments, server system 202 selects the publications from a particular geographic region, for example the Middle East. Server system 202 determines inter-correlations and relationships among the risk factors in risk factor set 602 (FIG. 6) to generate a two-factor structure of risk perception. The two factors of the structure are first principal component 804, which may be termed "dread" and second principal component 805, which may be termed "unknown". More specifically, server system 202 applies an orthogonal transformation to extract one or two variables (e.g., first principal component 804 and second principal component 805) that explain most of the variation within collected risk perception data for first audience 112, which may be located in a particular geographic region (e.g., the Middle East). Using PCA, server system 202 extracts eigenvalues from a correlation coefficient matrix to determine which risk factors have the most influence. Server system 202 may determine an overall cumulative emotional intensity (i.e., a determination of a risk of emotional response) for one or more publications, for example first publication 110, by determining the magnitude of the risk factors, as described above, and weighting the magnitudes of the risk factors using weight set 806 for first principal component 804 and weight set 812 for second principal component 805, then summing first principal component 804 and second principal component 805.

As publishers 104, 106, 108 alter their communication strategies, server system 202 detects even slight changes in the usage of a single risk factor (e.g. first risk factor 604) and calculates the resulting change in the risk of an emotional response from an audience, for example first audience 112, according to the respective weight (e.g., first weight 808 and/or first weight 814) in weighting model 802. Accordingly, server system 202 is able to precisely evaluate which issues (e.g., first issue 102 or second issue 103) in the media are likely to influence attitudes and behavior (i.e., emotional response) of one or more audiences, for example first audience 112.

Figure 9:
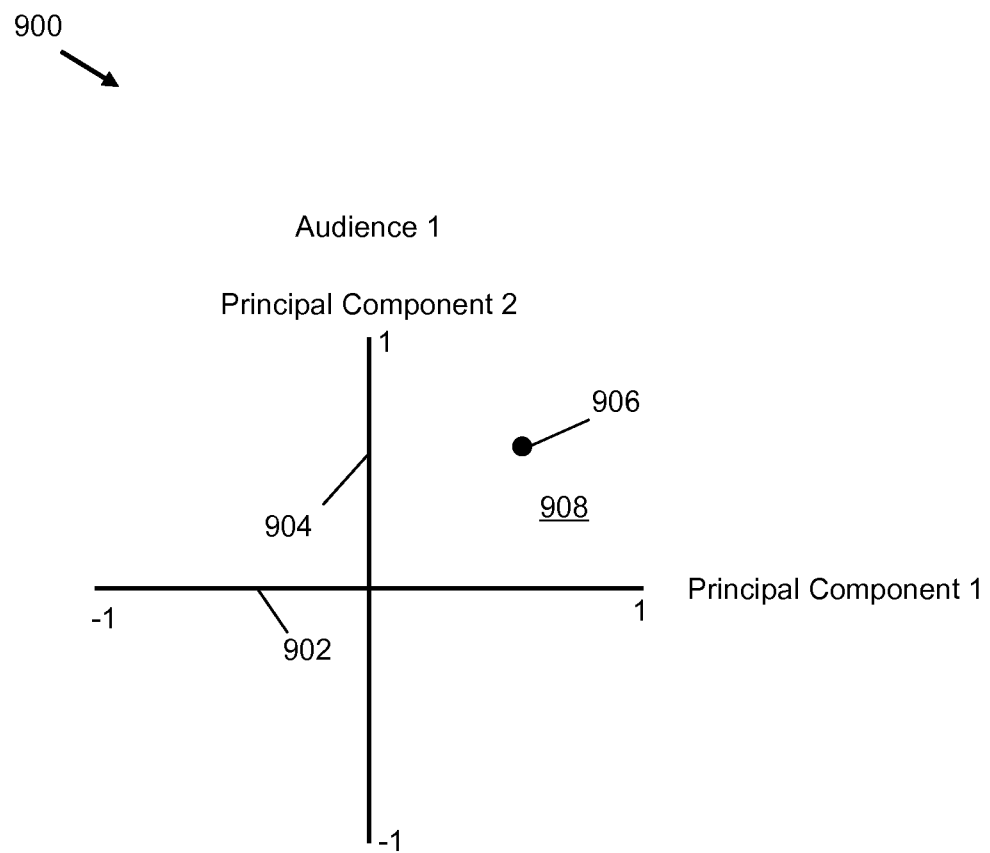
FIG. 9 is an example plot of a determined risk associated with a first issue for a first audience.

FIG. 9 is an example plot 900 of a determined risk of an emotional response associated with first issue 102 for first audience 112. First axis 902 ranges from −1 to 1 and corresponds to first principal component 804 (FIG. 8). Second axis 904 also ranges from −1 to 1 and corresponds to second principal component 805 (FIG. 8). In other embodiments, first axis 902 and/or second axis 904 have different ranges. A higher number on an axis 902 or 904 represents a higher risk of an emotional response. Accordingly, point 906, located in an upper right quadrant 908, and representing the determined risk of an emotional response associated with first issue 102 for first audience 112, is relatively high. Server system 202 may generate plot 900 upon receiving a selection of first audience 112, first issue 102, one or more publications 110 from one or more publishers 104, 106, 108, and performing the processes described above with reference to FIGS. 6-8 to determine the corresponding risk of an emotional response. Server system 202 may transmit plot 900 to a client computing device 204 for display thereon, or may display or otherwise output plot 900 directly.

Figure 10:
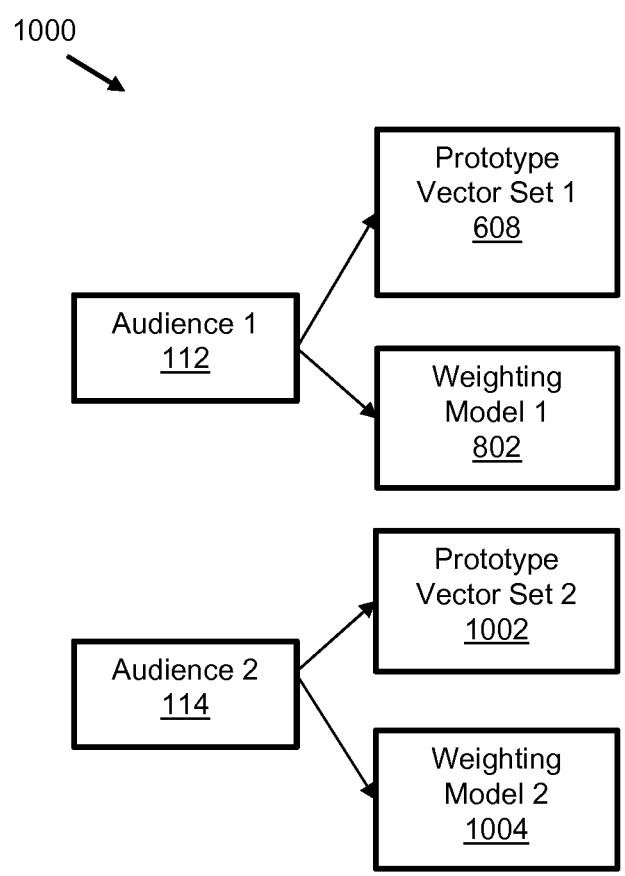
FIG. 10 is a block diagram showing an example relationship between a first audience, a first prototype vector set and a first weighting model, and a second audience, a second prototype vector set and a second weighting model.

FIG. 10 is a block diagram showing an example relationship between first audience 112, a first prototype vector set 608, first weighting model 802, and second audience 114, a second prototype vector set 1002, and a second weighting model 1004. More specifically, and as described above, first audience 112 falls into a different category than second audience 114. Accordingly, second audience 114 may perceive publications 110 relating to an issue, for example first issue 102, differently than first audience 112. Accordingly, second audience 114 may have a different risk of an emotional response to the publications 110 than first audience 112. To account for the differences in audiences 112 and 114, server system 202 may generate, store, and retrieve from database 208 second prototype vector set 1002 and second weighting model 1004 for second audience 114 using processes described above with reference to first audience 112.

Figure 11:
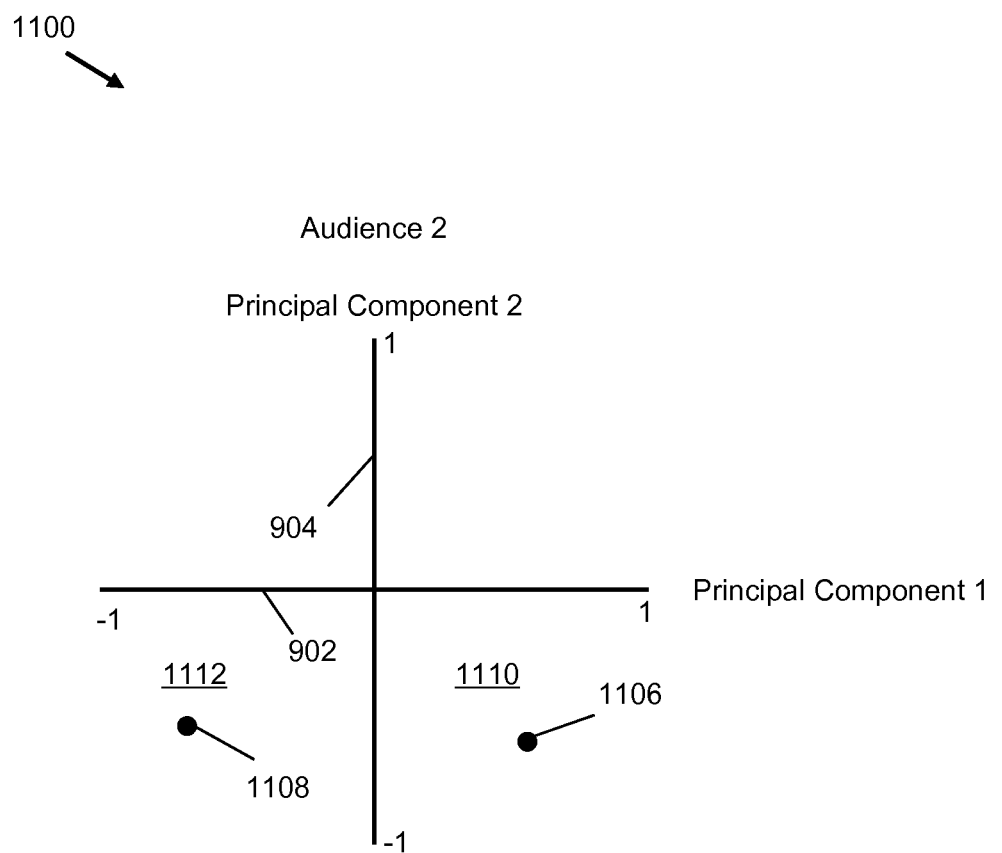
FIG. 11 is an example plot of determined risks associated with a first issue and a second issue for a second audience.

FIG. 11 is an example plot of determined risks of emotional responses associated with first issue 102 and second issue 103 for second audience 114. First point 1106, corresponding to first issue 102, falls into lower right quadrant 1110. Second point, 1108, corresponding to second issue 103, falls into lower left quadrant 1112. Server system 202 may generate plot 1100 upon receiving a selection of second audience 112, first issue 102, second issue 103, one or more publications 110 from one or more publishers 104, 106, 108 pertaining to first issue 102 and second issue 103, and performing the processes described above with reference to FIGS. 6-8 to determine the corresponding risk of an emotional response for second audience 114 on first issue 102 and second issue 103. Server system 202 may transmit plot 1100 to a client computing device 204 for display thereon, or may display or otherwise output plot 1100 directly. As shown by plots 900 and 1100, second audience has a lower risk of an emotional response to first issue 102 (point 1106) than does first audience 112 (point 906 of FIG. 9).

Figure 12:
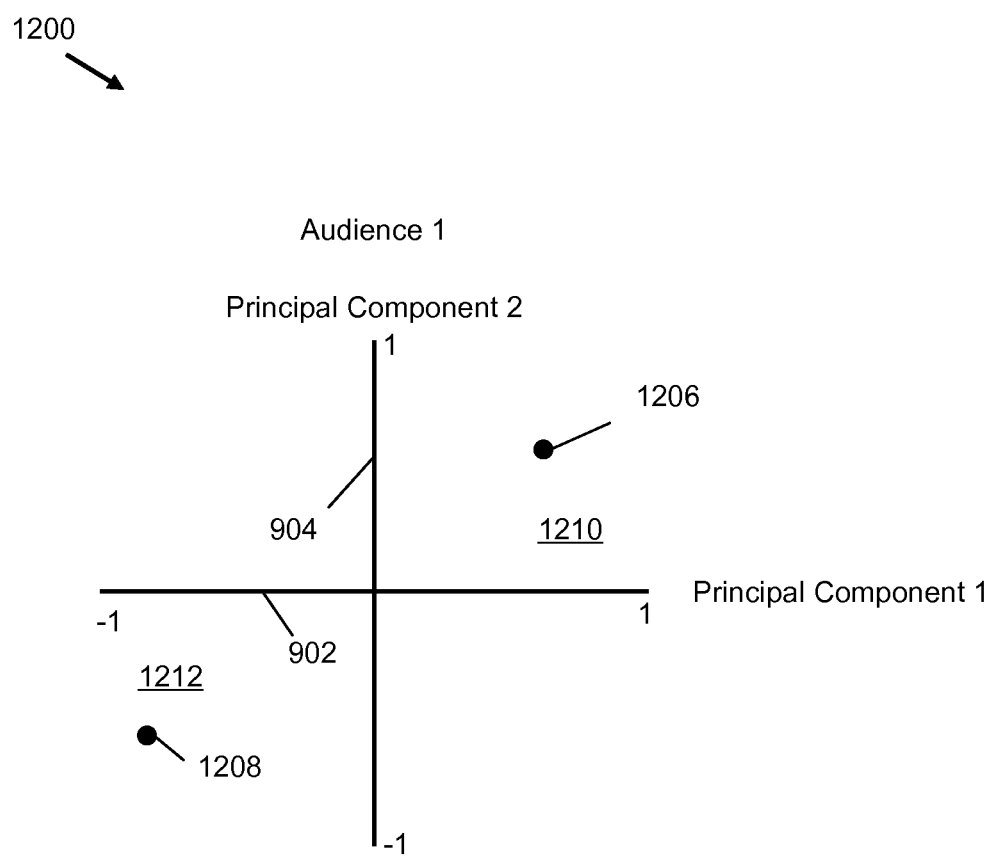
FIG. 12 is an example plot of determined risks associated with a first issue, based on publications from a first publisher and a second publisher, for a first audience.

FIG. 12 is an example plot 1200 of determined risks of emotional response associated with first issue 102, based on publications from first publisher 104 and second publisher 106, for first audience 112. First point 1206, corresponding to one or more publications from first publisher 104 with regard to first issue 102, falls into upper right quadrant 1210. Second point, 1208, corresponding to one or more publications from second publisher 106 with regard to first issue 103, falls into lower left quadrant 1212. Accordingly, publications 110 from first publisher 104 represent a higher risk of an emotional response from first audience 112 with regard to first issue 102 than do publications 110 from second publisher on first issue 102. Unlike plots 900 and 1100, plot 1200 separates out the determined risks of an emotional response for the same audience (first audience 112) for the same issue (first issue 102) based on who the publisher is (first publisher 104 or second publisher 106), and thereby indicates how each publisher 104 and 106 portrays the first issue 102 in their respective publications 110.

Server system 202 may generate plot 1200 upon receiving a selection of second audience 112, first issue 102, one or more publications 110 from publishers 104 and 106 pertaining to first issue 102, and an indication that the determined risks of emotional response should be separated out by publisher. Server system 202 performs the processes described above with reference to FIGS. 6-8 to determine the corresponding risks of an emotional response based upon the above selections. Server system 202 may transmit plot 1200 to a client computing device 204 for display thereon, or may display or otherwise output plot 1200 directly.

As emotional intensity reflects the perceptions and attitudes of audiences (e.g., first audience 112 and second audience 114), server system 202 may facilitate identifying potential for behavioral change and movements, or other emotional responses. By determining risks of emotional response, as described above, for issues (e.g., first issue 102 and second issue 103), between and across distinct audiences (e.g., first audience 112 and second audience 114), sever system 202 facilitates identifying possible signs of behavioral risk and social action. Analyzing a range of publications relating to varying issues using server system 202 facilitates determining an assessment of all publishers and their contributions to producing or mitigating a risk of an emotional response from an audience. Comparison of risk associated with each issue between various audiences, publications, publishers, and/or speakers may reveal conflicting communication strategies among publishers, including systematic attempts to manipulate public perception and mobilize or suppress social movement (i.e., an emotional response).

Figure 13:
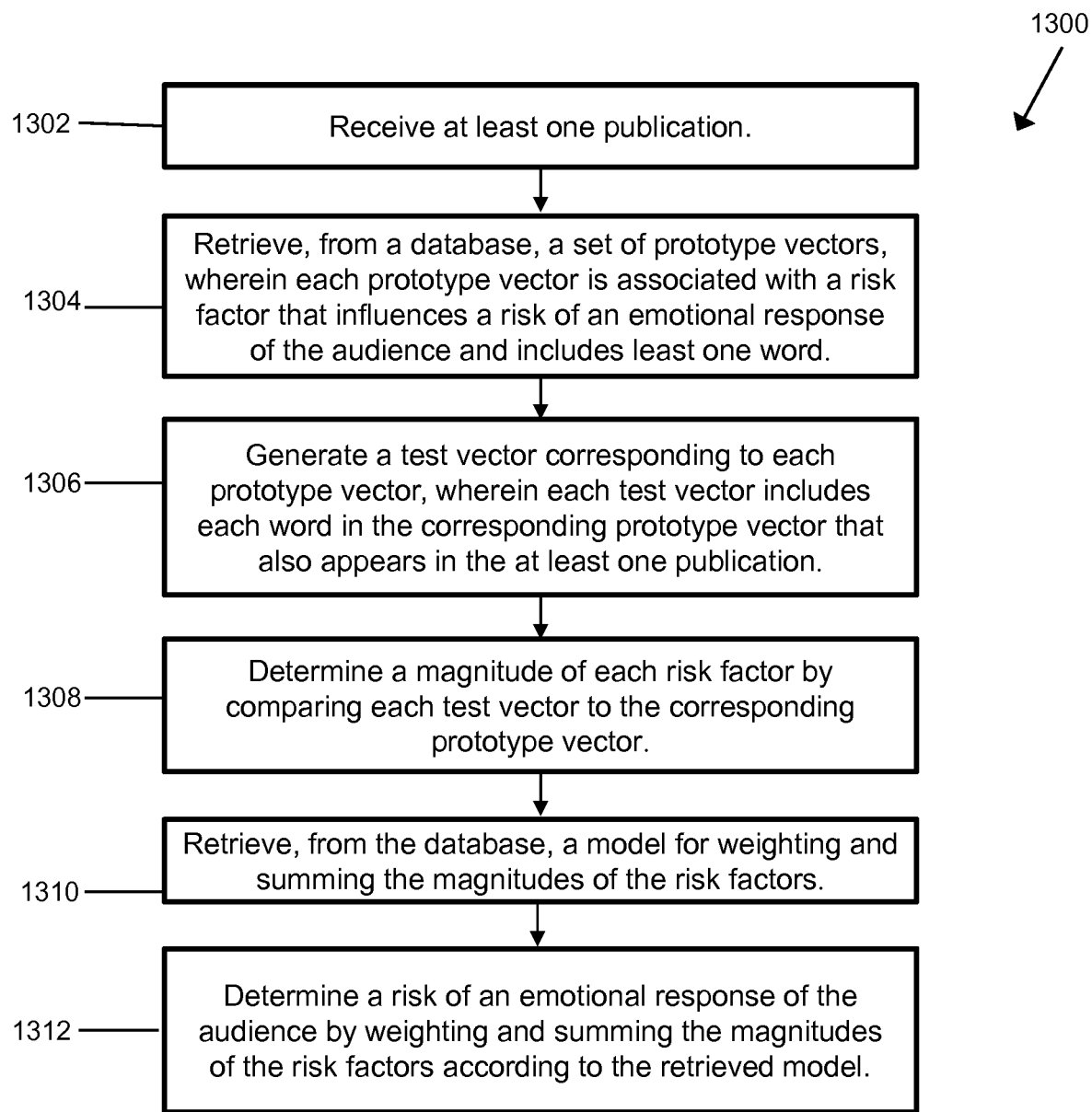
FIG. 13 is a flowchart of an example process that may be performed by a computing device of the risk determination system to determine a risk of an emotional response of an audience to at least one publication.

FIG. 13 is a flowchart of an example process 1300 that may be performed by a computing device, for example server system 202, to determine a risk of an emotional response of an audience (e.g., first audience 112) to at least one publication 110. Initially, server system 202 receives 1302 at least one publication 110. Additionally, server system 202 retrieves 1304, from database 208, a set of prototype vectors, for example prototype vector set 608, wherein each prototype vector (e.g., first prototype vector 610) is associated with a risk factor. For example first risk factor 604 is associated with first prototype vector 610. Each risk factor influences a risk of an emotional response of first audience 112 and includes at least one word, for example first word 614.

Additionally, server system 202 generates 1306 a test vector, (e.g., first test vector 704) corresponding to each prototype vector. For example, first test vector 704 of test vector set 702 corresponds to first prototype vector 610 of prototype vector set 608. Each test vector includes each word, for example first word 614, in the corresponding prototype vector 610 that also appears in the at least one publication 110. Additionally, server system 202 determines 1308 a magnitude 710 of each risk factor 604, by comparing each test vector 704 to the corresponding prototype vector 610. Additionally, server system 202 retrieves 1310, from database 208, a model 802 for weighting and summing the magnitudes 708 of the risk factors 602. Additionally, server system 202 determines a risk of an emotional response 906 of the audience 112 by weighting and summing the magnitudes 708 of the risk factors 602 according to the retrieved model 802.

Figure 14:
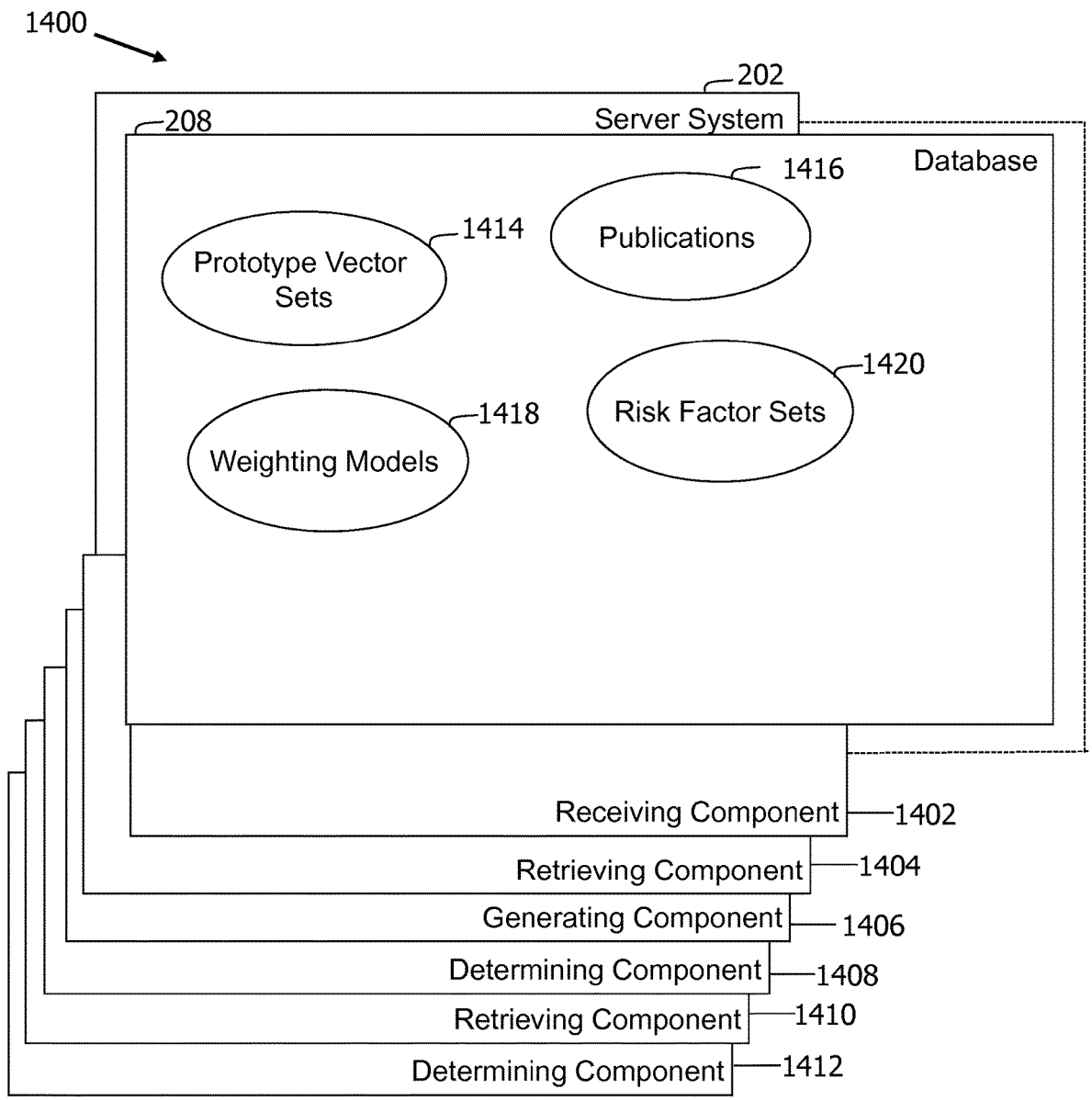
FIG. 14 is a diagram of components of one or more example computing devices that may be used in the risk determination system shown in FIGS. 1-3.

FIG. 14 is a diagram of components of one or more example computing devices that may be used in server system 202. FIG. 14 further shows a configuration of database 208 (FIG. 2). Database 208 is coupled to several separate components within server system 202, which perform specific tasks.

Server system 202 includes a receiving component 1402 for receiving at least one publication 110. Server system 202 also includes a retrieving component 1404 for retrieving, from database 208, a set of prototype vectors, for example prototype vector set 608. Each prototype vector (e.g., first prototype vector 610), is associated with a risk factor that influences a risk of an emotional response of first audience 112. Further, each prototype vector includes at least one word, for example first word 614. Additionally, server system 202 includes a generating component 1406 for generating a test vector corresponding to each prototype vector. Each test vector includes each word in the corresponding prototype vector that also appears in the at least one publication. Additionally, server system 202 includes a determining component 1408 for determining a magnitude of each risk factor by comparing each test vector to the corresponding prototype vector. Additionally, server system 202 includes a retrieving component 1410 for retrieving, from the database 208, a model for weighting and summing the magnitudes of the risk factors. Further, server system 202 includes a determining component 1312 for determining a risk of an emotional response of the audience by weighting and summing the magnitudes of the risk factors according to the retrieved model.

In an example embodiment, database 208 is divided into a plurality of sections, including but not limited to, a prototype vector sets section 1414, a publications section 1416, a weighting models section 1418, and a risk factor sets section 1420. These sections within databases 208 are interconnected to retrieve and store information in accordance with the functions and processes described above.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 205, 305, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/ or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for using a vector data structure to increase a speed of determining a risk of an emotional response of an audience to at least one publication, the method is implemented by a server computing device in communication with a database, the method comprising:

receiving, by the server computing device, a plurality of documents in an electronic format;

identifying, by the server computing device for each of a plurality of risk factors, a first set of the documents relevant to the risk factor and a second set of the documents not relevant to the risk factor, wherein each risk factor is a predetermined characteristic that influences the emotional response of the audience;

analyzing, by the server computing device for each of the risk factors, the corresponding first set of documents to determine occurrences and distributions of words within the first set of documents, and storing in the database, for each of the risk factors, an associated prototype vector, wherein each prototype vector includes a word set, each of the words in the word set weighted by a normalized frequency of occurrence of the word in the corresponding first set of documents;

comparing, by the server computing device, each prototype vector to occurrences and distributions of the words in the associated word set in the second set of documents not relevant to the associated risk factor to verify the prototype vector;

receiving, by the server computing device, the at least one publication, the at least one publication comprising one of a news item, an article, an opinion, a blog entry, and a social media message, the at least one publication communicated over a network, and converting the at least one publication from a first format to a second format by converting one of images, video, and audio to text that represents the at least one publication;

retrieving, by the server computing device from the database, the prototype vectors, each prototype vector stored in the database as a multi-dimensional data structure having a first column that includes each of the words in the word set, a second column that includes the normalized frequency of occurrence of each of the words in the word set, and a third column that includes the weight assigned to each of the words in the word set;

generating, by the server computing device, a test vector corresponding to each prototype vector, wherein each test vector includes each word in the corresponding prototype vector that also appears in the at least one publication;

determining, by the server computing device, a magnitude of each risk factor by comparing each test vector to the corresponding prototype vector;

retrieving, by the server computing device from the database, a model for weighting and summing the determined magnitudes of the risk factors, the model generated by the server computing device by performing principal component analysis (PCA) on a predetermined number of publications and performing an orthogonal transformation to determine a first principal component of the risk of the emotional response of the audience and a second principal component of the risk of the emotional response of the audience, and extracting eigenvalues from a correlation coefficient matrix to determine which risk factors most influence the audience;

determining, by the server computing device, a risk of an emotional response of the audience by weighting and summing the magnitudes of the risk factors according to the retrieved model, and transmitting the risk of the emotional response of the audience to at least one client computing device; and generating based on the risk of the emotional response before an emotional response occurs and outputting, by the server computing device to a user interface displayed on a display of the at least one client computing device, an electronic user interactive visual representation of the risk of the emotional response in a first geographic region and a second geographic region that is different from the first geographic region that simultaneously shows a variation of the risk of the emotional response in the first geographic region and the second geographic region that is different from the first geographic region, the electronic user interactive visual representation showing on the display for both the first geographic region and the second geographic region a respective point on a graph of the first principal component of the risk of the emotional response of the audience having a range from negative one representing a low risk to positive one representing a high risk along a first axis and a second principal component of the risk of the emotional response of the audience having a range from negative one representing the low risk to positive one representing the high risk along a second axis.

2. The method of claim 1, wherein:
receiving at least one publication further comprises:
receiving an identification of a first topic; and
receiving at least one publication that pertains to the first topic; and
determining a risk of an emotional response further comprises determining a risk of an emotional response pertaining to the first topic.

3. The method of claim 1, wherein receiving at least one publication further comprises:
receiving an identification of a first publisher; and
receiving the at least one publication from the first publisher.

4. The method of claim 1, further comprising:
generating a first set of prototype vectors for a first audience; and
generating a second set of prototype vectors for a second audience, wherein the first set of prototype vectors is different from the second set of prototype vectors.

5. The method of claim 4, wherein:
generating a first set of prototype vectors for a first audience further comprises generating a first set of prototype vectors for a first audience that is located in the first geographic region; and
generating a second set of prototype vectors for a second audience further comprises generating a second set of prototype vectors for a second audience that is located in the second geographic region that is different from the first geographic region.

6. The method of claim 1, wherein retrieving the prototype vectors further comprises determining a category of the audience and retrieving a set of prototype vectors associated with the category.

7. The method of claim 1, wherein retrieving the model further comprises determining a category associated with the audience and retrieving a model associated with the category.

8. The method of claim 1, wherein generating a test vector corresponding to each prototype vector further includes:
indexing the at least one received publication; and
weighting each word in each test vector based at least on a frequency of the word in the at least one indexed publication.

9. The method of claim 1, further comprising generating the model for weighting and summing the magnitudes of the risk factors by performing the principal component analysis.

10. The method of claim 1, further comprising:
associating, by the computing device in the database, the at least one publication as at least one historical publication of a first publisher;
receiving, by the computing device, at least one new publication associated with the first publisher;
generating, by the computing device, a new test vector corresponding to each prototype vector, wherein each new test vector includes each word in the corresponding prototype vector that also appears in the at least one new publication;
determining, by the computing device, a magnitude of each risk factor associated with the at least one new publication by comparing each new test vector to the corresponding prototype vector;
determining, by the computing device, a change in the magnitude of at least one risk factor associated with the at least one new publication as compared to the magnitude of the corresponding at least one risk factor associated with the at least one historical publication; and
outputting, by the computing device to at least one client computing device, an alert identifying the change in usage of the at least one risk factor by the first publisher.

11. A server computing device for using a vector data structure to increase a speed of determining a risk of an emotional response of an audience to at least one publication, the server computing device is communicatively coupled to a database, the server computing device comprising:
  a processor; and
  a memory device in communication with the processor, the processor to:
  receive a plurality of documents in an electronic format;
  identify, for each of a plurality of risk factors, a first set of the documents relevant to the risk factor and a second set of the documents not relevant to the risk factor, wherein each risk factor is a predetermined characteristic that influences the emotional response of the audience;
  analyze, for each of the risk factors, the corresponding first set of documents to determine occurrences and distributions of words within the first set of documents, and store in the database, for each of the risk factors, an associated prototype vector, wherein each prototype vector includes a word set, each of the words in the word set weighted by a normalized frequency of occurrence of the word in the corresponding first set of documents;
  compare each prototype vector to occurrences and distributions of the words in the associated word set in the second set of documents not relevant to the associated risk factor to verify the prototype vector;
  receive the at least one publication, the at least one publication comprising one of a news item, an article, an opinion, a blog entry, and a social media message, the at least one publication communicated over a network, and convert the at least one publication from a first format to a second format by converting one of images, video, and audio to text that represents the at least one publication;
  retrieve, from the database, the prototype vectors, each prototype vector stored in the database as a multi-dimensional data structure having a first column that includes each of the words in the word set, a second column that includes the normalized frequency of occurrence of each of the words in the word set, and a third column that includes the weight assigned to each of the words in the word set;
  generate a test vector corresponding to each prototype vector, wherein each test vector includes each word in the corresponding prototype vector that also appears in the at least one publication;
  determine a magnitude of each risk factor by comparing each test vector to the corresponding prototype vector;
  retrieve, from the database, a model for weighting and summing the determined magnitudes of the risk factors, the model generated by the server computing device by performing principal component analysis (PCA) on a predetermined number of publications and performing an orthogonal transformation to determine a first principal component of the risk of the emotional response of the audience and a second principal component of the risk of the emotional response of the audience, and extracting eigenvalues from a correlation coefficient matrix to determine which risk factors most influence the audience;
  determine a risk of an emotional response of the audience by weighting and summing the magnitudes of the risk factors according to the retrieved model, and transmitting the risk of the emotional response of the audience to at least one client computing device; and
  generate based on the risk of the emotional response before an emotional response occurs and output to a user interface displayed on a display of the at least one client computing device an electronic user interactive graphical representation of the risk of the emotional response in a first geographic region and a second geographic region that is different from the first geographic region that simultaneously shows a variation of the risk of the emotional response in the first geographic region and the second geographic region that is different from the first geographic region, the electronic user interactive visual representation showing on the display for both the first geographic region and the second geographic region a respective point on a graph of the first principal component of the risk of the emotional response of the audience having a range from negative one representing a low risk to positive one representing a high risk along a first axis and a second principal component of the risk of the emotional response of the audience having a range from negative one representing the low risk to positive one representing the high risk along a second axis.

12. The computing device of claim 11, wherein the processor is further to retrieve the prototype vectors by determining a category associated with the audience and retrieving a set of prototype vectors associated with the category.

13. The computing device of claim 11, wherein the processor is further to retrieve the model by determining a category associated with the audience and retrieving a model associated with the category.

14. The computing device of claim 11, wherein the processor is further to generate a test vector corresponding to each prototype vector by:
  indexing the at least one received publication; and
  weighting each word in each test vector based on at least a frequency of the word in the at least one indexed publication.

15. The computing device of claim 11, wherein the processor is further to generate the model for weighting and summing the magnitudes of the risk factors by performing the principal component analysis.

16. The computing device of claim 11, wherein the processor is further to:
  associate, in the database, the at least one publication as at least one historical publication of a first publisher;
  receive at least one new publication associated with the first publisher;
  generate a new test vector corresponding to each prototype vector, wherein each new test vector includes each word in the corresponding prototype vector that also appears in the at least one new publication;
  determine a magnitude of each risk factor associated with the at least one new publication by comparing each new test vector to the corresponding prototype vector;
  determine a change in the magnitude of at least one risk factor associated with the at least one new publication as compared to the magnitude of the corresponding at least one risk factor associated with the at least one historical publication; and
  output to at least one client computing device an alert identifying the change in usage of the at least one risk factor by the first publisher.

17. A non-transitory computer-readable storage device having processor-executable instructions embodied thereon for using a vector data structure to increase a speed of determining a risk of an emotional response of an audience to at least one publication, wherein when executed by a server computing device communicatively coupled to a database, the processor-executable instructions cause the server computing device to:

receive a plurality of documents in an electronic format;

identify, for each of a plurality of risk factors, a first set of the documents relevant to the risk factor and a second set of the documents not relevant to the risk factor, wherein each risk factor is a predetermined characteristic that influences the emotional response of the audience;

analyze, for each of the risk factors, the corresponding first set of documents to determine occurrences and distributions of words within the first set of documents, and store in the database, for each of the risk factors, an associated prototype vector, wherein each prototype vector includes a word set, each of the words in the word set weighted by a normalized frequency of occurrence of the word in the corresponding first set of documents;

compare each prototype vector to occurrences and distributions of the words in the associated word set in the second set of documents not relevant to the associated risk factor to verify the prototype vector;

receive the at least one publication, the at least one publication comprising one of a news item, an article, an opinion, a blog entry, and a social media message, the at least one publication communicated over a network, and convert the at least one publication from a first format to a second format by converting one of images, video, and audio to text that represents the at least one publication;

retrieve, from the database, the prototype vectors, each prototype vector stored in the database as a multi-dimensional data structure having a first column that includes each of the words in the word set, a second column that includes the normalized frequency of occurrence of each of the words in the word set, and a third column that includes the weight assigned to each of the words in the word set;

generate a test vector corresponding to each prototype vector, wherein each test vector includes each word in the corresponding prototype vector that also appears in the at least one publication;

determine a magnitude of each risk factor by comparing each test vector to the corresponding prototype vector;

retrieve, from the database, a model for weighting and summing the determined magnitudes of the risk factors, the model generated by the server computing device by performing principal component analysis (PCA) on a predetermined number of publications and performing an orthogonal transformation to determine a first principal component of the risk of the emotional response of the audience and a second principal component of the risk of the emotional response of the audience, and extracting eigenvalues from a correlation coefficient matrix to determine which risk factors most influence the audience;

determine a risk of an emotional response of the audience by weighting and summing the magnitudes of the risk factors according to the retrieved model, and transmit the risk of the emotional response of the audience to at least one client computing device; and generate based on the risk of the emotional response before an emotional response occurs and output to a user interface displayed on a display of the at least one client computing device, an electronic user interactive graphical representation of the risk of the emotional response in a first geographic region and a second geographic region that is different from the first geographic region that simultaneously shows a variation of the risk of the emotional response in the first geographic region and the second geographic region that is different from the first geographic region, the electronic user interactive visual representation showing on the display for both the first geographic region and the second geographic region a respective point on a graph of the first principal component of the risk of the emotional response of the audience having a range from negative one representing a low risk to positive one representing a high risk along a first axis and a second principal component of the risk of the emotional response of the audience having a range from negative one representing the low risk to positive one representing the high risk along a second axis.

18. The non-transitory computer-readable storage device of claim 17, wherein the processor-executable instructions further cause the computing device to:

associate, in the database, the at least one publication as at least one historical publication of a first publisher;

receive at least one new publication associated with the first publisher;

generate a new test vector corresponding to each prototype vector, wherein each new test vector includes each word in the corresponding prototype vector that also appears in the at least one new publication;

determine a magnitude of each risk factor associated with the at least one new publication by comparing each new test vector to the corresponding prototype vector;

determine a change in the magnitude of at least one risk factor associated with the at least one new publication as compared to the magnitude of the corresponding at least one risk factor associated with the at least one historical publication; and output to at least one client computing device an alert identifying the change in usage of the at least one risk factor by the first publisher.

* * * * *